Oct. 30, 1923.　　　　　　　　　　　　　　　　　1,472,395
G. IACOBITTI
LUMP SUGAR PACKING MACHINE
Filed Nov. 14, 1921　　　　6 Sheets-Sheet 1
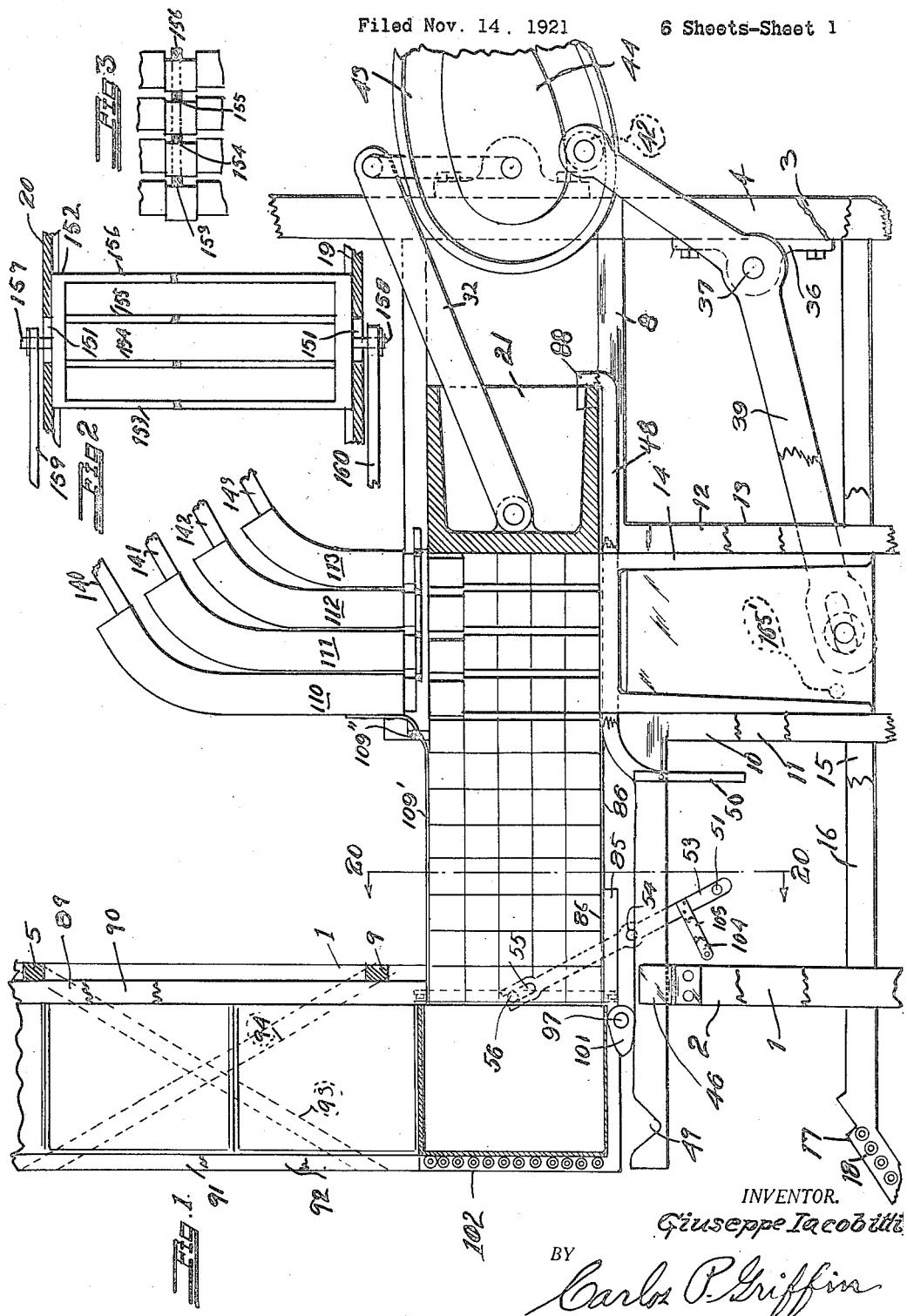
INVENTOR.
Giuseppe Iacobitti
BY
Carlos P. Griffin
ATTORNEY.

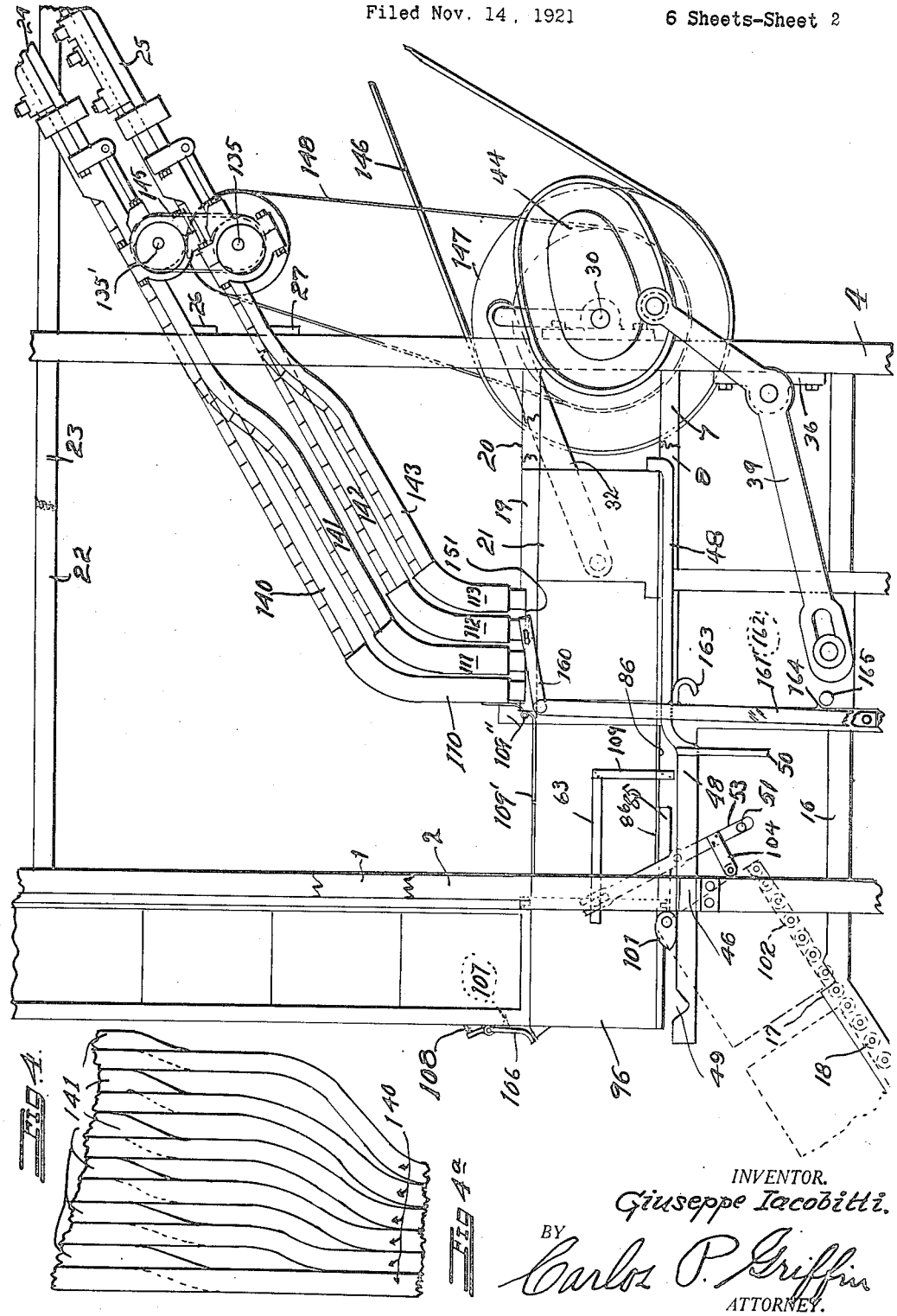

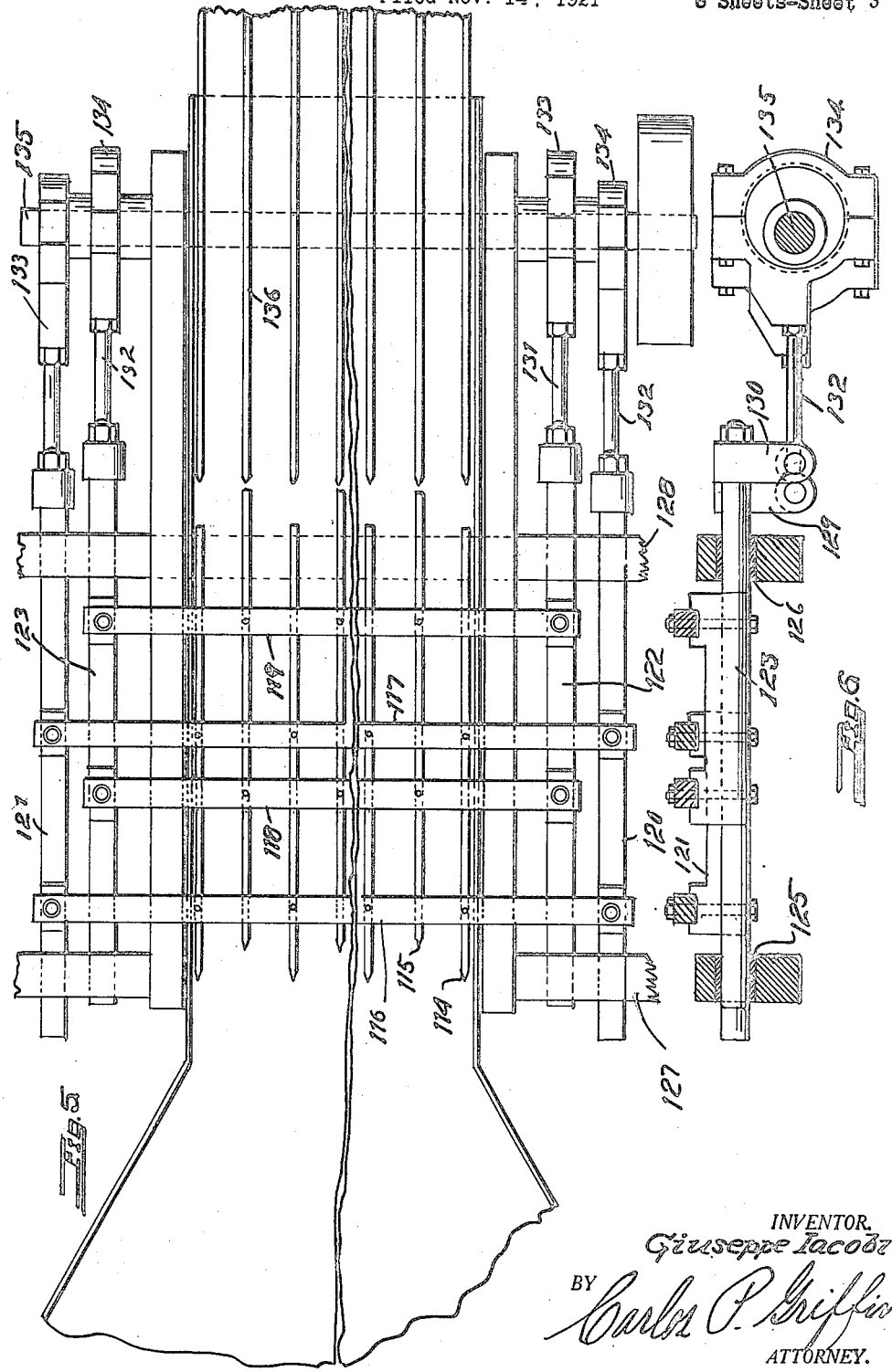

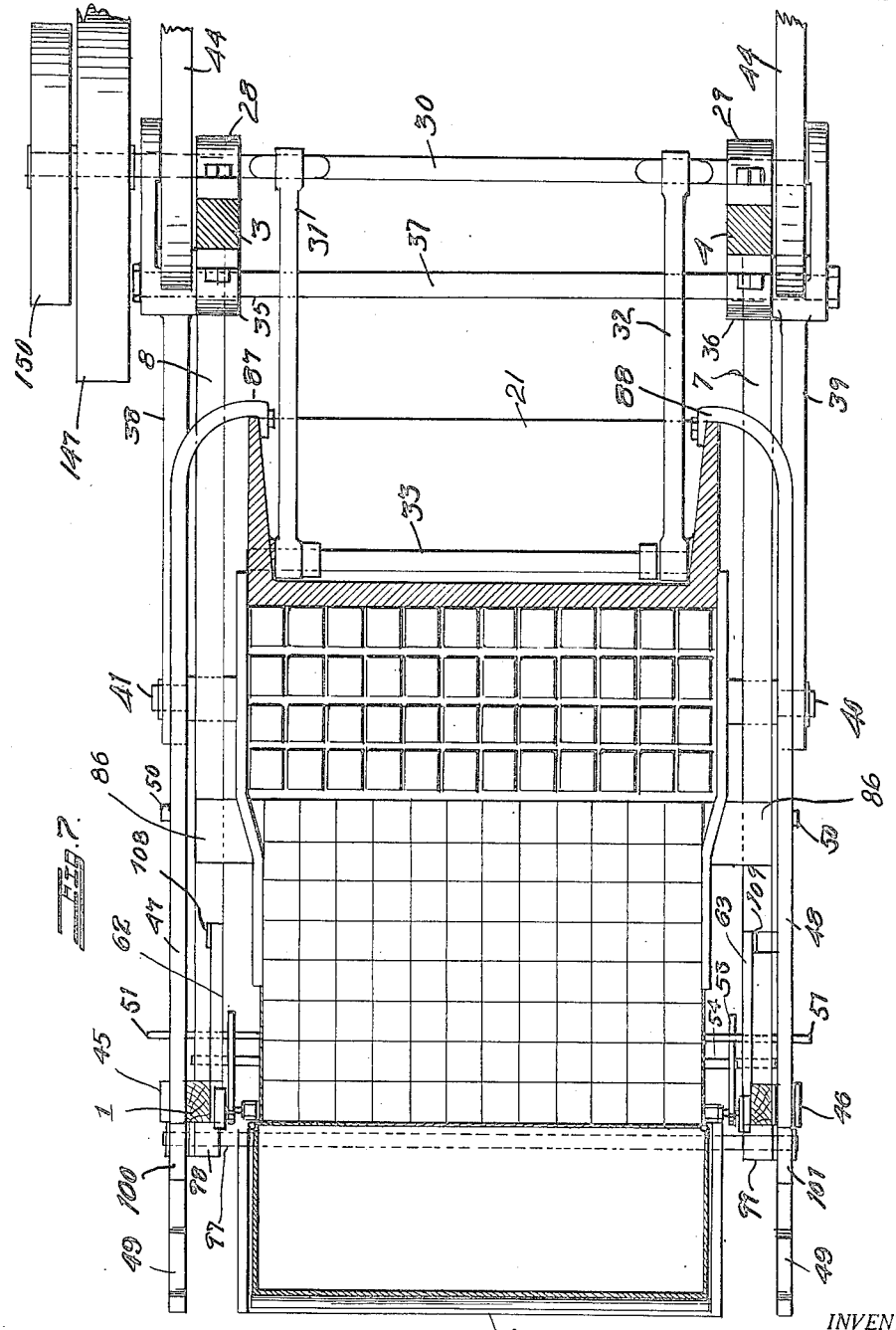

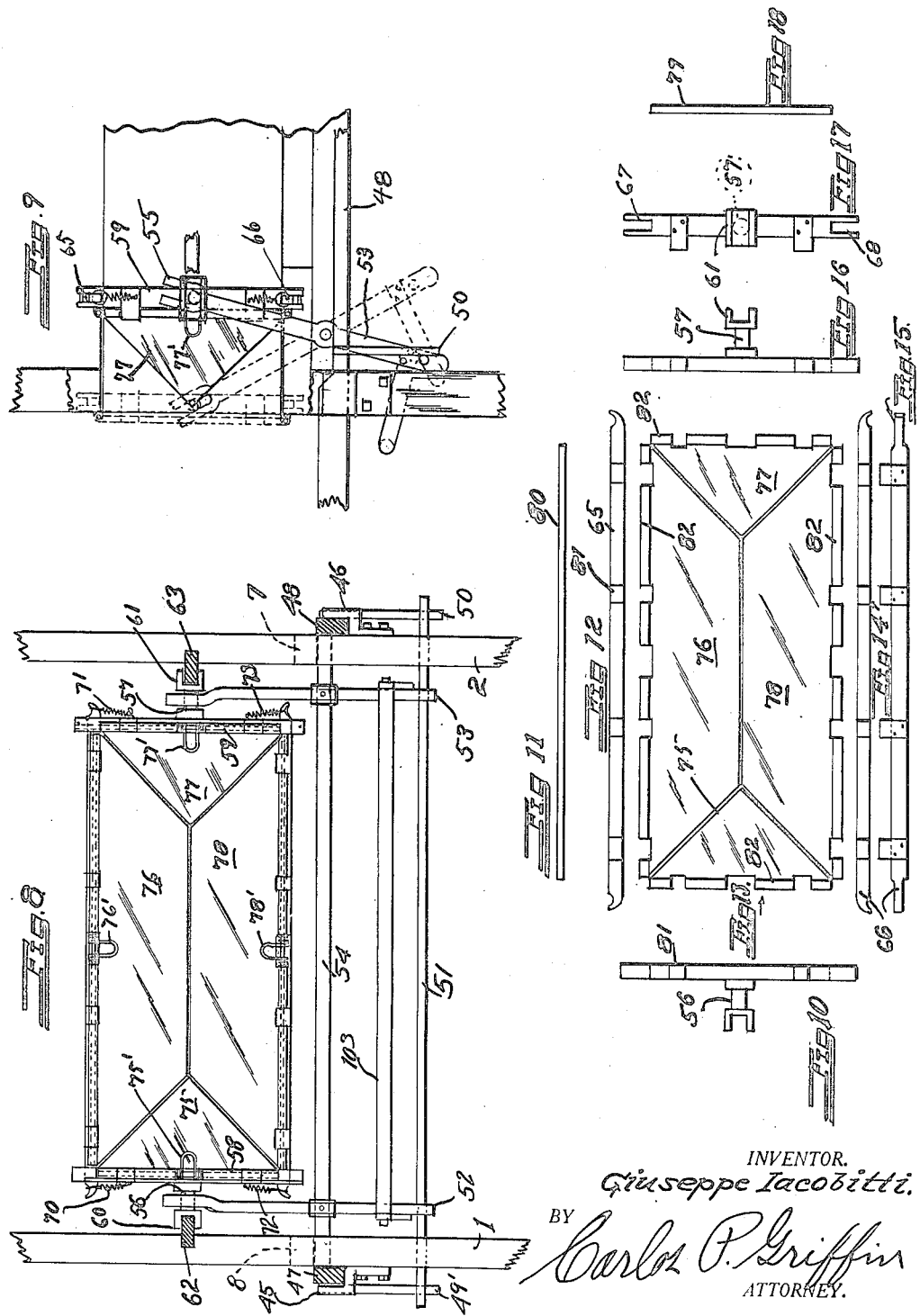

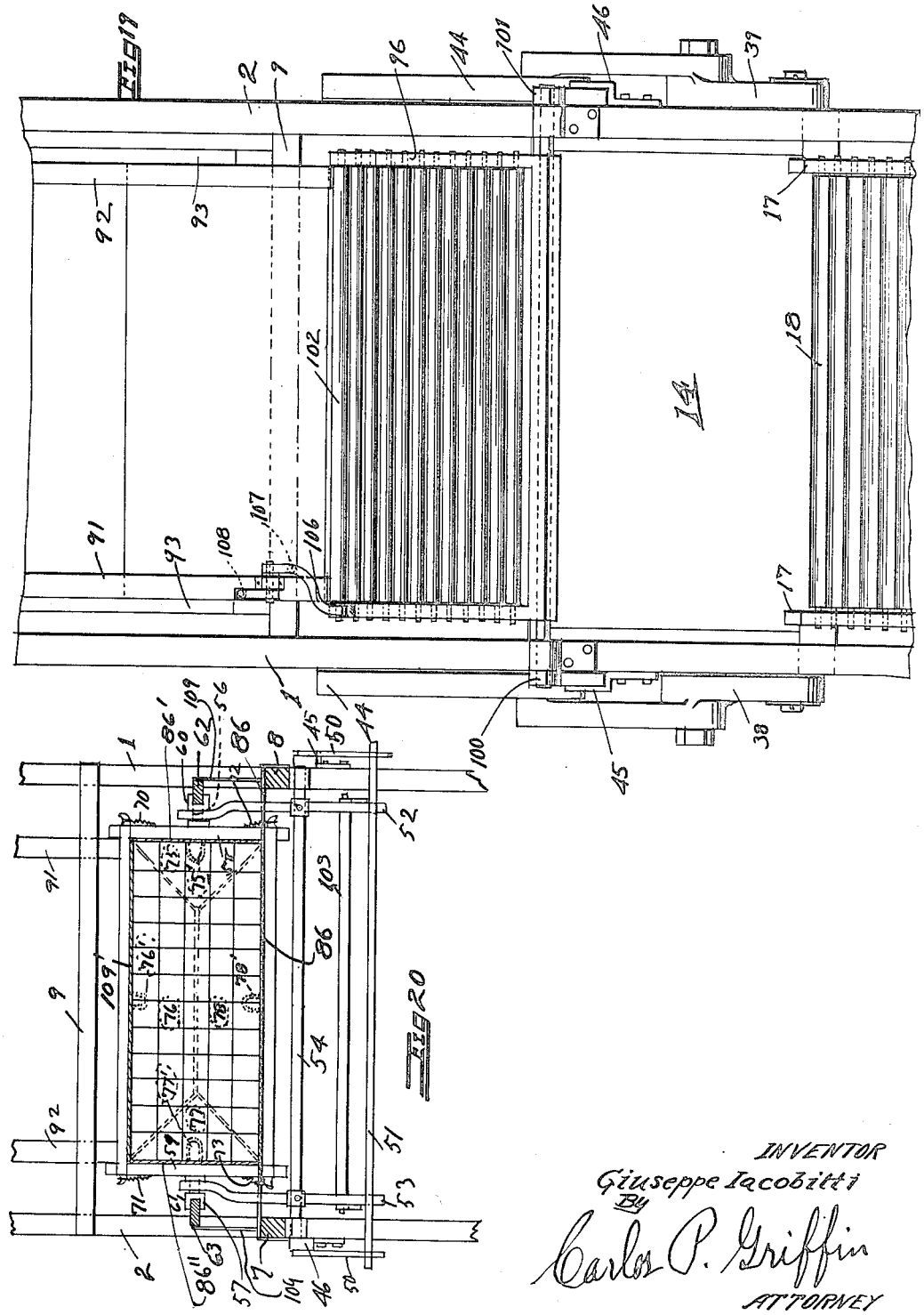

Patented Oct. 30, 1923.

1,472,395

UNITED STATES PATENT OFFICE.

GIUSEPPE IACOBITTI, OF CROCKETT, CALIFORNIA.

LUMP-SUGAR-PACKING MACHINE.

Application filed November 14, 1921. Serial No. 514,963.

*To all whom it may concern:*

Be it known that I, GIUSEPPE IACOBITTI, a citizen of the United States, residing at Crockett, in the county of Contra Costa, State of California, have invented a new and useful Lump-Sugar-Packing Machine, of which the following is a specification in such full and clear terms as will enable those skilled in the art to construct and use the same.

This invention relates to a machine for packing cube sugar in cartons, and its object is to assemble a plurality of the sugar cubes in the proper position upon an elevator for placing them in the proper order to be inserted in the carton without the interposition of hand labor.

It will be apparent to those skilled in the art that it requires a considerable amount of hand labor to assemble sugar cubes in cartons, so that it is an object of this invention to dispense with that hand labor and assemble the sugar in the cartons after the sugar has been assembled upon a feeding platform, from which platform it is directed to the assembling apparatus, and from which assembling apparatus the cartons are delivered to a chute to be packed in boxes or otherwise treated.

A further object of the invention is to provide an improved feeding apparatus which will direct the sugar cubes into the chutes in such a manner as to prevent them from blocking the chutes.

A further object of the invention is to provide means whereby the series of sugar cubes will be held snugly together until they have been sufficiently entered into the carton to avoid the liability of having the cartons catch on the sugar cubes and thereby disarrange the entire series of cubes.

A further object of the invention is to provide an improved filled carton discharge which will receive the filled cartons and deliver them to any desired place.

Another object of the invention is to provide an improved apparatus for holding the sugar cubes when one entire series of cubes has been placed in position to be pushed into the carton.

Other objects of the invention will appear as the description proceeds.

An embodiment of the invention is shown in the accompanying drawings in which the same reference numeral is applied to the same portion throughout, but I am aware that there may be modifications thereof.

Fig. 1 is a side elevation partly in section of the complete machine.

Fig. 2 is a plan view of the stop for holding the series of sugar cubes as they are being moved down upon the feeding table.

Fig. 3 is a sectional view of the frame shown in Figure 2 showing the position of the sugar cubes just as the cross bars engage the top series.

Fig. 4 is a side elevation of the complete machine.

Fig. 4ª is a plan view of a portion of the chutes showing the way they are divided and pass under the next adjacent chute to the discharge chutes.

Fig. 5 is a top plan view of one of the feed hoppers the same being broken away narrower than it exactly is for purpose of illustration.

Fig. 6 is a side elevation of the apparatus for moving the feeding fingers longitudinally.

Fig. 7 is a plan view of the machine with the feed chutes removed and a portion of the cover placed over the pile of sugar cubes taken away for purpose of illustration.

Fig. 8 is a side elevation of the apparatus for holding the sugar cubes in place as they are being pushed into the carton.

Fig. 9 is an end view of the apparatus shown in Figure 8, the dotted lines illustrating its movement.

Fig. 10 is a side elevation of the rod to which the extensible wings are connected.

Fig. 11 is a side elevation of one of the hinge rods.

Fig. 12 is a side elevation of one of the corner bars of the extensible wing gate.

Fig. 13 is a side elevation of the extensible wing gates showing the apparatus for holding them in the position indicated removed therefrom.

Fig. 14 is a side elevation of the lower bar for holding the wing gates in place.

Fig. 15 is a plan view of one of the side bars for holding the wing gates in place.

Fig. 16 is a view of one of the ends bars for holding the extensible wing gates in place.

Fig. 17 is a view of the bar shown in Figure 16 looking at right angles to Figure 16, and Fig. 18 is a side elevation of the pin used for holding the wing gates in place on the bar shown in Figures 16 and 17.

Fig. 19 is a view in elevation looking from the left Fig. 1.

Fig. 20 is a view in section on line 20—20 Fig. 1, looking in the direction of the arrows.

This machine is built upon a frame work consisting of four posts 1 to 4 inclusive, the posts 1 and 2 being connected at their tops by means of a cross bar 5, while two longitudinally extending bars 7 and 8 connect the posts 1 and 3 and 2 and 4 respectively. Above the place where the bars 7 and 8 join the posts 1 and 2 there is a cross bar 9 connecting said posts to aid in giving the frame rigidity.

Depending from the bars 7 and 8 are four guides 10 to 13 inclusive which form a track for the movement of a box-like vertical plunger 14. These guides are in turn connected at their lower ends to two longitudinally extending bars 15 and 16 which extend beyond the posts 1 and 2 and have the inclined chute 17 for discharging the filled cartons from the machine connected thereto.

This chute 17 is provided with rollers as indicated at 18 in order to make the cartons move down the same easily.

The rails 7 and 8 and two other rails 19 and 20 form a track extending substantially at right angles to the track for the plunger 14 in which track another plunger 21 is movable, the bars 47, 48 resting on the rails to hold the back end of the plunger 21 up. The bottom 86 is connected to and supports the side members 86', 86" and it is supported by the side rails 7 and 8. The plunger 14 is for the purpose of gently lowering a pile of assembled cubes without disturbing them, while the plunger 21 is for the purpose of pushing the assembled pile of cubes into the carton or at least into the discharge chute extending toward the carton, after which they are finally pushed into the carton.

At the top of the main supporting posts there are two other longitudinally extending rails 22 and 23 which form the support for the feed chutes 24, 25; cross bars 26 and 27 also being used to support the chutes at an intermediate point.

Bearings 28, 29 carry a double crank shaft 30. The crank shaft 30 is connected at its crank portions to two pitmen 31, 32, which pitmen are in turn connected to a shaft 33 carried by the horizontally movable plunger 21.

Mounted in suitable bearings 35, 36 on the posts 3 and 4 is a shaft 37. This shaft pivotally supports two levers 38, 39 at its ends. These levers are connected to projecting pins 40, 41 on the vertically movable plunger 14, and at their opposite ends they each have a roller 42 which moves in a groove 43 of a cam 44 mounted on the shaft 30. There are two of said cams, one for each side of the machine and both have exactly the same shape in order to raise the plunger 14 evenly.

Mounted on the posts 1 and 2 are two brackets 45, 46 which form the support for a pair of sliding bars 47, 48. These bars are each notched as indicated at 49, for a purpose presently to be described, and they each have a depending bar as shown at 49', 50, which bars engage the ends of a cross bar 51 carried by the lower end of two levers 52, 53, said levers being connected to the ends of a shaft 54 pivotally mounted on the longitudinally extending frame members 7 and 8. These two levers 53 are forked at their upper ends as indicated at 55 to receive the pins 56, 57 which support the two vertical bars 58, 59 of the expansible frame for holding the sugar cubes in place when they are being put into the carton.

The pins 56, 57 carry slides 60, 61 which are movable along bars 62, 63 supported by the frame of the machine. The frame carrying the yielding gates forming the end of the chute for holding the sugar lumps in place consists of the vertical bars 58, 59 which are connected to the horizontally extending bars 65, 66 by passing the latter bars through slots 67, 68 in the vertical bars. Springs 70 to 73 inclusive are then passed over the ends of the bars 65, 66 and attached to the bars 58, 59, thus producing a frame that is capable of some expansion. Wings 75 to 78 inclusive are hinged to the bars 58, 59 and 65, 66, pins 79, 80 being used for this purpose. The wings 75 to 78 serve to bridge the gap between the top edges of the carton and the chute in which the pile of lumps moves. These wings are pushed into the carton by the sugar and when the sugar has been pushed to the bottom of the carton the arms 49'—50 pull them out to allow the carton to discharge from the machine. These pins pass through openings in the lugs 81 on the bars and through lugs 82 on the wings. Springs 75' to 78' are provided for holding the wings 75 to 78 in the closed position shown in Fig. 8.

The supporting rails 7 and 8 are notched as indicated at 85 to permit the necessary movement of the frame carrying the expansible wings, and the pile of lumps of sugar moves from its position upon the plunger 14 over a thin metal floor 86 in its travel to the carton.

The slides 47, 48 are connected at one end as indicated at 87, 88 to the plunger 21, which plunger operates them and it will be observed by an examination of Figure 1 that the plunger 14 will stand still during about one-half the revolution of the cam 44, during which time the plunger 21 is pushing a fresh pile of lumps of sugar into the carton, at the end of which period the plunger 14 will rise and the plunger 21 will move more to the right than is shown in Figure 1, for the purpose of dumping the loaded carton, as will be now explained.

The empty cartons are placed on their sides in a chute formed by the rails 89, 90 supported from the cross bar 5 and extending down to the top of the chute upon which the sugar is piled. Other rails 91, 92 are connected to the rails 89, 90 by means of pairs of diagonal braces 93, 94. This produces an open bottom chute closed by the carton holder 96. The carton holder is supported on a shaft 97 journaled in two bearings 98, 99. This shaft has two cams 100, 101 at its ends, which cams ride upon the top of the two rails 47, 48 and they are shaped so that they will lift the carton carrier to the position shown in Figures 1 and 4 at all times except when the notches 49 in said rails pass under said cams when the carton holder will drop to the position indicated in dotted lines in Figure 4, and permit the filled carton to pass down the rollers 102 and on to the discharge rollers 18. At this time the bottom of the carton carrier will strike the bar 103 which connects the two arms 104, 105 on the lower portion of the levers 52, 53 to throw the expansible wing frame back into the position indicated in dotted lines in Figure 1. This frame will have been previously pushed out by the arms 49', 50 to the position shown in Figure 9, with its wings engaging the outside of the horizontal chute in which the pile of sugar lumps is placed just before being placed in the carton.

In order to insure the retention of the cartons in the chute when the loaded carton is being discharged, an arm 106 is pivotally mounted on one of the vertical members of the chute, and it has a sharp point 107 which engages the lowermost carton in the chute. A spring 108 causes this arm to engage said carton when the loaded carton is being lowered, but as soon as the carton holder is raised to the position shown in Figure 4, the pin 107 will be disengaged from the carton and it will fall into the carton holder.

The forward end of the bars 62, 63 is supported on posts 108, 109 to which said bars are connected. In order to hold the sugar lumps in place without disturbing their position, there is a hinged cover 109' pivotally supported from the frame at 109'' which rests upon the pile of sugar cubes during their passage from the collecting position to the carton.

The feed chutes 24, 25 are supported above the machine from the frame work and are sufficiently inclined to cause the lumps of sugar to run down into the discharge chutes 110 to 113 inclusive. These chutes extend across the top of the machine and discharge the lumps of sugar on the vertically movable plunger 14.

In the upper portion of the feed chutes there are two series of movable guide partitions 114 and 115. The series of guide partitions 114 are supported from two cross bars 116, 117, while the series of partitions 115 are supported from two cross bars 118, 119. The two cross bars 116, 117 are in turn supported from two longitudinally movable bars 120, 121, while the two cross bars 118, 119 are supported from two longitudinally movable bars 122, 123. These longitudinally movable bars are supported in slide bushings 125, 126 carried by the cross bars 127, 128 supporting the chutes from the main frame. These bars have depending brackets 129, 130 at their ends, and they are connected to pitman rods 131, 132 which have eccentric straps 133, 134 passing around eccentrics on the shaft 135. It will be seen that there are a pair of eccentrics at both ends of the shaft 135 in order to move the feeding fingers 114, 115 evenly at both sides of the chute.

The feeding fingers 114, 115 are aligned with the upper ends of the partitions 136 of the chutes 24, 25. There are only two chutes 24, 25 and Fig. 4ᵃ indicates in a diagrammatic way that alternate channels in each chute are deflected downward out of the plane of the chute and the deflected channels are then all bent to the left to lie under the formerly adjacent channels, all channels in each plane being then moved adjacent each other at their ends to produce a series of four chutes 140 to 143 with channels in the same planes to deposit the lumps as close together as possible.

Each of the chutes 24, 25 is provided with the movable fingers, the same as the chute shown in Figure 5, the fingers in the upper chute receiving their reciprocation from a shaft 135' driven by a belt 145 passing over pulleys on the shaft 135'. The machine receives power from a belt 146 passing over a pulley 147, and the finger in the feed chute receives power from a belt 148 passing over the pulley 149 and under the pulley 150 on the shaft 30.

The rails 19 and 20 are slotted as indicated at 151 to receive the feed plate 152. This plate consists of four bars 153 to 156 inclusive movable in the slot in said bars 19 and 20, and it has lugs 157, 158 at its ends, which lugs are connected to links 159, 160. These links are in turn connected to the levers 161, 162 which are pivotally mounted in the lower portion of the frame, and which levers have lugs 163, 164 thereon to contact with the projecting pins 165 on the vertically movable plunger.

The operation of the apparatus is as follows: Assuming a sufficient supply of cartons to be placed in the rack, they will be dropped down so that the first carton occupies a place in the carton holder with its open side presented toward the machine. Sugar will be piled promiscuously on the upper portion of the hoppers of the chutes 24, 25. At this time the reciprocating fingers 114, 115 will cause the sugar lumps to be aligned with the spaces between them, and the lumps of sugar will then pass on down the partitions 136 into the discharge chutes 110, 111.

If the machine is in operation the sugar lumps will all collect upon the feed plate bars as illustrated in Figure 1 until such time as the feed plunger 14 rises sufficiently close to the pile of sugar. At this time its pins 165, 165' will contact with the lugs 163 on the lever 161, one of such levers being on each side of the machine so as to cause the feed plate to move out from under the lumps of sugar and allow them to fall a short distance to the top of the plunger.

As the cam operating the plunger continues to rotate, it will cause the plunger to be depressed allowing the pile of sugar lumps to fall down to the position shown in Figure 1; whereupon the pins 165, 165' will contact with the lugs 164 on the levers 161 and push the feed plate under the discharge spouts again. This operation will take place about as shown in Figure 3, which will be a short distance above the bottom of the movement of the plunger 14, but this will not prevent the sugar lumps pushed aside from collecting on the pile as shown in Figure 1; they will be straightened and brought into the proper position by the movement of the plunger 21. As the plunger 21 moves forward it will cause the entire series of lumps of sugar to be pushed against the spring held wings 75 to 78 inclusive. These wings will expand into the box and thereby prevent the lumps of sugar from catching on any of the box edges. When the plunger 21 has reached the end of its movement, the depending arms 49', 50 will engage the cross bar 51 and cause the frame carrying the wings 75 to 78 to be moved back to the position shown in Figure 9. The plunger 21 will then make its return stroke, and near the end of its return stroke the depressions in the members 47, 48 will permit the carton holder to drop down to the position shown in dotted lines in Figure 4, so that the carton will slide off on the carton discharge chute. During this time the plunger 14 will have raised to the top of its movement and its pin 165 will engage the hooks 163 to release the next series of sugar lumps. They will then drop upon the plunger and as it moves downwardly the lumps of sugar will pass from the chutes 110 to 113 until a new series has been placed on the plunger; whereupon as the plunger passes down, its pin 165 will strike the projection 164 and move the plate 152 over sufficiently to prevent any more lumps from passing out of the feed chute.

It will be apparent that the machine is exceedingly simple since it is operated with only one main shaft, two feeder shafts and two cams.

What I claim is as follows, but various modifications may be made in the construction shown in the drawings and above particularly described form, within the purview of my invention.

1. In a sugar packing machine the combination with means for packing the sugar lumps in a carton, of chutes for delivering the sugar lumps to the packing mechanism, and two series of bars aligned with the chute partitions and oppositely reciprocable for arranging the sugar lumps in the chutes.

2. An apparatus of the class described comprising means for packing a series of arranged sugar lumps in a carton, a plurality of chutes for delivering the sugar lumps to the packing mechanism, a series of partitions in said chutes to maintain separate lines of arranged sugar lumps, and two sets of oppositely reciprocatory plates for arranging the sugar lumps before they are fed to the chutes.

3. In a machine for packing lump sugar, a plunger for pushing an arranged series of sugar lumps into a carton, a series of chutes for delivering the arranged sugar lumps to the packing mechanism, a plate through which the sugar lumps pass, and means to move said plate laterally to arrest the movement of the sugar lumps in the chutes during one period of operation of the machine.

4. A machine for packing lump sugar in cartons comprising the combination with a carton holder of a series of chutes to deliver the sugar lumps to the machine in arranged series, a single chute into which the pile of arranged lumps is delivered and which positions them to be placed in the carton, a plunger for pushing the sugar lumps into the carton, a series of spring held plates against which the pile of arranged sugar lumps is pushed to prevent the pile of sugar lumps from engaging the sides of the carton and means to project and retract said plates to pass them into and remove them from the carton.

5. In a machine of the class described comprising means for packing a series of sugar lumps into cartons, a movable frame carrying a plurality of spring pressed wings against which the pile of sugar lumps is pressed when moved into the carton, means to restore said frame and the wings carried thereby to their initial position after having been once pushed into the carton, and means to supply the apparatus with arranged series of lumps of sugar.

6. An apparatus of the class described comprising a sugar receiving chute, two sets of oppositely reciprocating plates therein to arrange the lumps of sugar in order, a series of chutes extending therefrom, a vertically movable plunger on which lumps sufficient to fill a carton are placed, means to stop the flow of lumps when one charge has been positioned, and a horizontally movable plunger to pack said sugar lumps into a carton.

7. An apparatus of the class described comprising a pivoted carton holder, cams for supporting said carton holder, means to arrange a series of lumps of sugar, means to push the sugar lumps into the carton, said means also being connected to the means for permitting the carton holder to be depressed to discharge its loaded carton, a frame carrying a plurality of spring wings arranged to be projected into the carton upon pressure of the arranged pile of lumps for preventing the arranged series of sugar lumps from catching on the edges of the carton, and means operated by the carton carrier to place said frame in a position to receive pressure from the newly arranged series of sugar lumps after one operation thereof.

In testimony whereof I have hereunto set my hand this 7th day of November, A. D. 1921.

GIUSEPPE IACOBITTI.